Jan. 20, 1959     T. H. HORRELL     2,869,535

AIRCRAFT HEATING SYSTEM

Filed May 12, 1954     3 Sheets-Sheet 1

Theodore H. Horrell
*INVENTOR.*

BY
*ATTORNEY.*

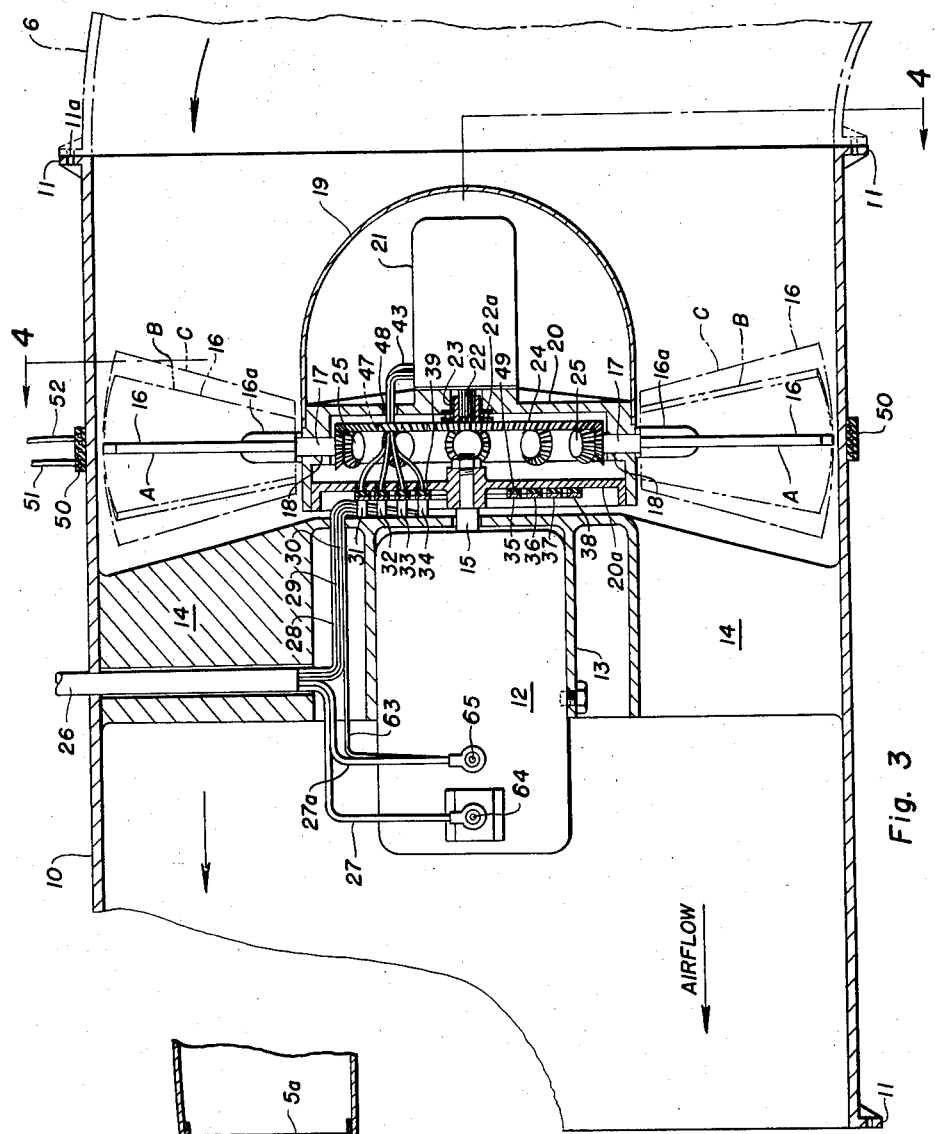

Jan. 20, 1959   T. H. HORRELL   2,869,535
AIRCRAFT HEATING SYSTEM
Filed May 12, 1954   3 Sheets-Sheet 3

Theodore H. Horrell
INVENTOR.

BY *James M. Clark*

ATTORNEY.

United States Patent Office 2,869,535
Patented Jan. 20, 1959

2,869,535

AIRCRAFT HEATING SYSTEM

Theodore H. Horrell, Greencastle, Pa., assignor to Fairchild Engine and Airplane Corporation, a corporation of Maryland Application May 12, 1954, Serial No. 429,223

7 Claims. (Cl. 126—110)

The present invention relates generally to blowers or fans and more particularly to improvements in adjustable blade arrangements in such devices for the improved control of flow through conduits or ducts.

In fan or blower installations, it is frequently desirable to control the air or other fluid from zero flow to the maximum flow at which the fan can impel the air through the duct. These conditions are particularly pronounced in the heating, deicing and ventilating operations of aircraft, especially between the ground condition, when the blower is used, and the cruising condition when the flow of air through the duct is supplied by ram air pressure due to forward flight of the aircraft, or other vehicle, at which time the blower can be shut down.

The present invention is directed to an improved form of adjustable blade fan wherein the blades may be adjusted into their flat pitch positions in which they completely close off the flow through the duct, into intermediate operating air impelling positions, or to a full feathered position in which they present a minimum of resistance to the rammed air flow through the duct with the fan in a non-operating condition. The present improvement has particular application to installations in conjunction with the deicing of aircraft wings and other bodies or the heating of cabins or other interior spaces of aircraft and other vehicles, although it is not limited to such uses.

It is, accordingly, a major object of the present invention to provide an improved adjustable blade fan or blower. It is a further object to provide such a fan for use in a duct wherein the blades are adjustable, and the fan controllable, from a flat pitch adjustment in which they completely close off all flow through the duct, to a full feathered position in which the fan is stopped and a minimum of resistance is presented to the flow through the duct. It is a further objective to provide such a controllable bladed fan which may be adjusted during operation of the system to an intermediate blade pitch for operation of the fan for the flow of air through the duct by the power drive for the fan. It is a further object to provide a controllable fan which can be used to create flow, to stop flow or permit flow therethrough when created or induced by other means. A corollary objective of the present invention is to provide a simplified and efficient means for selectively supplying either rammed air or blower air to an aircraft heating or deicing system with means for completely shutting off or otherwise controlling the said air supply. It is a further object to provide automatic controls for an improved flow control fan or blower of a type which lends itself to a more efficient and cooperative relationship with the other components of the system.

Other objects and advantages of the present invention will become apparent to those skilled in the art, after a reading of the following description, taken in conjunction with the accompanying drawings, forming a part hereof, in which:

Fig. 2 is a sectional elevational view of the same as taken along the lines 2—2 of Fig. 1;

Fig. 3 is an enlarged sectional view of the flow control fan of Fig. 1 as taken along the lines 3—3 thereof;

Figure 1:
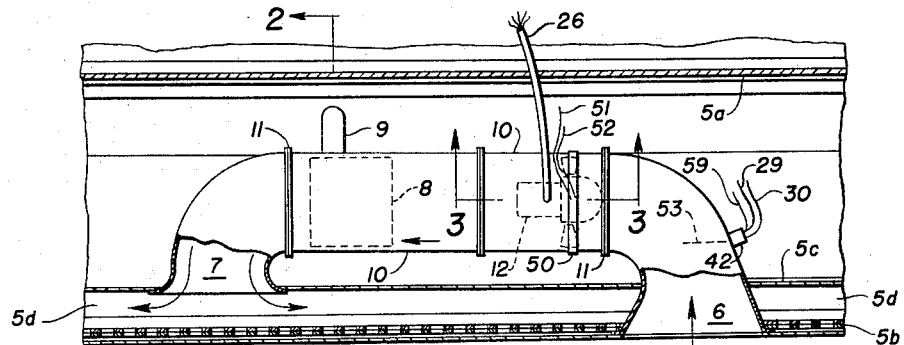
Fig. 1 is a sectional plan view of the leading edge of an aircraft wing showing a de-icing arrangement to which a form of the improved flow control fan has been applied.

Referring to Figs. 1 and 2, the numeral 5 designates an aircraft wing or airfoil having a transversely extending front spar 5a spaced from the leading edge of the wing. Closely spaced internally of the latter is the perforated nose or inner skin plate 5b within which is disposed the back plate or vertical wall 5c defining the transversely extending plenum chamber or passage 5d.

The leading edge of the wing 5 is provided with a ram air inlet opening 6 addressed to the relative air flow as the wing moves forwardly with the aircraft, being formed with an elbow into the transversely extending main duct 10. The opposite end of the latter is provided with a further forwardly directed elbow portion forming the duct outlet 7 which opens into the plenum chamber 5d. Within the transversely extending portion of the duct 10 adjacent the outlet 7, there is disposed a heater unit 8 which may preferably be of the internal combustion type having an exhaust conduit 9 through which the burned gases from the heater pass to the atmosphere through an eductor outlet at the lower surface of the wing as shown in Fig. 2. The duct sections 10, as well as the inlet and outlet elbow sections 6 and 7, respectively, are attached together by means of the flanges 11 and attachment bolts passing through the holes 11a. Within the first straight duct section 10 upstream of the heater 8, there is disposed a form of the improved flow control fan assembly indicated in Fig. 1 as driven by the electric motor 12.

Figure 4:
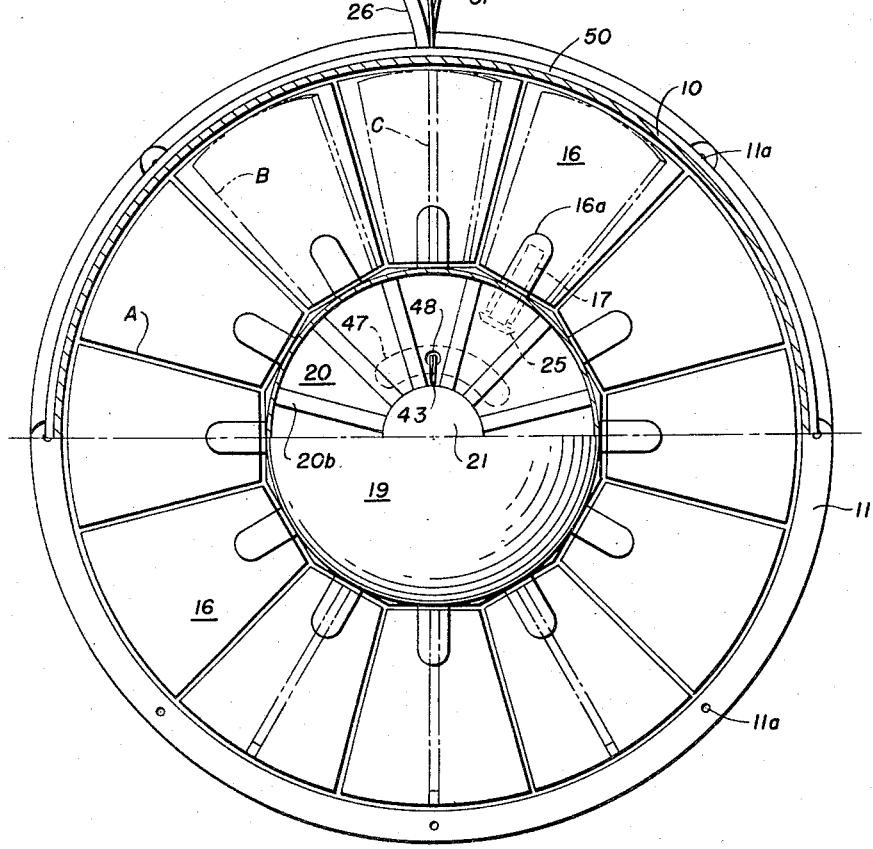
Fig. 4 is an end view, partially in cross-section, of the fan of Fig. 3 as taken along the lines 4—4 thereof.

Referring now to Figs. 3 and 4, the electric motor 12 is supported within a mounting frame 13 having a plurality of radially extending fixed guide vanes or supports 14. The latter supports 14 attach at their outer peripheries to the duct or housing 10 and are also made in such form as to serve as flow directing stator blades or vanes. The electric motor 12 drives the blower or fan assembly through the shaft 15 whereby the plurality of adjustable fan blades 16 are rotatively driven. These fan blades 16 are provided with blade hubs 16a and spindles 17 which are journalled within the hub openings or mounting holes 18 within the hub 20. The latter supports an electric actuator 21 on its forward face which drives the shaft 22 journalled within the bearing 22a extending through the front face of the hub 20 and in axial alignment with the motor shaft 15. A plurality of radial ribs 20b are formed on hub 20 which terminates at its rear in a transverse wall plate 20a, the entire blade actuating motor, control wiring and gearing being faired within the streamlined hub or housing 19. The actuator 21 through its shaft 22 drives the gear 24 enclosed within the hub assembly 20 which has a central opening therethrough at 23. Each of the blade spindles 17 has a pinion or bevel gear 25 fixed at its inner end in mating or meshing engagement with the large ring gear 24 whereby rotation of the latter by the actuator 21 will impart pitch adjustment rotation to the blades 16 in the axial sense within their mounting holes 18.

As shown in Fig. 3, a pair of wire leads 27 and 27a disposed within the conduit 26 conducts current to the electric motor 12 from externally of the duct housing 10 and connect respectively to the terminal 64 and to the ground lead 65 of the motor 12. The wiring is shown more fully in Fig. 5 and will be further described below in connection therewith. A second group of electrical leads consisting of the wires 28, 29 and 30 pass through the housing 10 and attach respectively to three brush assemblies 31, 32 and 33 mounted upon the motor support 13. A ground wire 63 connects the fourth brush assembly 34 with the ground terminal 65 disposed upon the housing of the motor 12. The brush assemblies 31, 32, 33 and 34 make contact respectively with the four slip rings 35, 36, 37 and 38 mounted upon the rear face of the hub assembly to rotate therewith and from which they are insulated by suitable insulating means 49. The rotating slip rings 35 to 38, inclusive are connected respectively by means of the wires 43 to 46, inclusive, each of which pass through suitable openings 39 within the web of the rear transverse plate 20a of the hub assembly. They also pass through an arcuate slot 47 in the web of the gear 24 and thence through a further opening 48 in the main web of the hub 20 from whence each of the four wires 43 to 46 is connected to the limit switch controls for the electric actuator 21, as shown and described in connection with Fig. 5. The streamlined spinner or shell 19 covers the forward face of the hub assembly 20 and serves to provide a minimum of drag and resistance, and to direct the air flow in a smooth stream to the fan blades 16.

In order to prevent the possibility of the fan blades 16 becoming frozen and locked in any position by the accumulation of ice which may form between the fan blade tips and the inner wall surface of the housing of the duct 10, an electric heating blanket in the form of the annular ring 50 is attached around the outside surface of the duct housing 10 in the transverse plane of the blade tips at the critical area. In the event the blades 16 should become locked by ice formation to the extent that they cannot be moved, the heating strip 50 is energized by suitably controlled current (as by the switch 41 in Fig. 5) passing through the lead wires 51 and 52 to warm the surfaces, melt the ice and to thereby free the blades.

Figure 5:
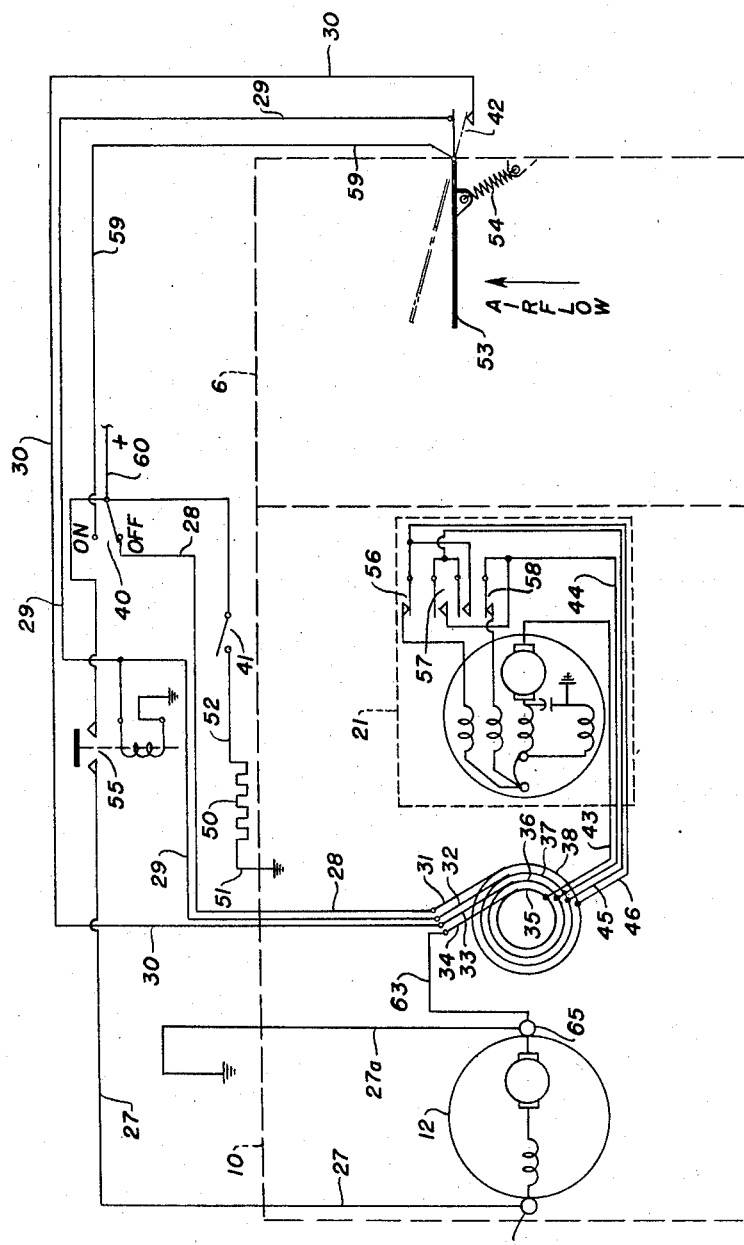
Fig. 5 is a wiring diagram of the flow control fan system.

Fig. 5 shows the wiring diagram for the operation and control of the above described system in which the duct inlet 6, as well as the main duct portion 10, are shown diagrammatically together with the blower drive motor 12 and the blade actuator motor 21. The main current supply from the power source 60 through the ground blower relay 55 is made through the line 27 to the motor 12 at the terminal 64 and is grounded by the line 27a connected to the motor terminal 65. From the main heater switch 40, the line 28 runs from the "off" contact of the switch through its brush 31, the slip ring 38, and the line 46, to the limit switches 56 and 57 to the actuator motor 21, and thence to the ground. When the switch 40 is in the "on" position, the power feed is made through the line 59 and the air flow or rammed air switch 42 associated with the vane 53 and the tension spring 54 disposed in the rammed air inlet duct 6.

In the position when the aircraft is on the ground, as shown in full lines in Fig. 5, the current flows back through the line 29, energizing the relay 55, and thence flows through the brush 32, the slip ring 37, the line 45 and the limit switch 57. Similarly, when the air flow switch 42 is actuated the line 29 is cut out and the current flows through the line 30, its brush 33, the slip ring 36, the line 44 and through the limit switch 58, as it may be affected by the switch 57, to the actuator 21. A connection is made from the motor 21 through the line 43, the slip ring 35, the brush 34 and the line 63 connected to the ground through the grounded terminal 65 of the motor 12. The abovementioned anti-icing heater blanket 50 is controlled by the switch 41 connected directly to the source of supply 60 by the line 52 and having its grounded return by means of the line 51.

The improved flow control fan and the accompanying heating system operates as follows: When the system is not in use, or when it is being shut down, the heater switch 40 is moved into the "off" position as shown in Fig. 5, thus tripping the ground blower relay 55 and cutting off the current supply from the source of electrical energy 60 to the blower motor 12. This applies whether or not the aircraft is upon the ground, or whether it is in flight, because throwing the switch 40 from the "on" to the "off" position interrupts the flow of current to the air flow switch 42 through the line 59 irrespective of whether the vane 53 is maintained by the spring 54 in its full line forward position, as shown in Fig. 5, when the aircraft is upon the ground, or whether the vane is subjected to ram air flow while the aircraft is in flight, as shown in the broken line portion, and overcomes the spring 54 to make contact with the line 30. When the heater switch 40 is moved to the "off" position, the current from the source 60 flows through the line 28, the brush 31, the slip ring 38 and the lines 46 through the limit switch 56 to the blade actuator motor 21 and thence to the ground return. The blade actuator motor 21 then drives the blades 16 from the angularly disposed blade pitch position B, in which they had previously been operatively driven by the blower motor 12, to the transversely disposed or closed position A in which they shut off all air flow to the heater system. As long as the switch 40 remains in the "off" position, the switch 42 is disconnected from the power supply and whether or not it is actuated by ram air flowing through the duct inlet 6 as the airplane is operated upon the ground, or in flight, the fan blades 16 remain in their closed positions A and no air flow passes through the duct 10 into the system.

When the system is started up with the airplane on the ground, the switch 40 is thrown to the "on" position which puts the line 59 and the switch 42 in circuit. Inasmuch as the aircraft is on the ground and there is no rammed air flow striking the vane 53, the switch 42 directs the current through the line 29, the brush 32, slip ring 37, the line 45, and the limit switch 57, to the blade actuator motor 21, the latter imparts rotation to the blades 16 until they are rotated into their operative blade pitch positions B at which the limit switch opens and the blades remain in the angularly disposed operative position. At the same time, as the current passes through the line 29 the ground blower relay 55 is energized, thereby placing the blower motor 12 directly in circuit through the line 27 with the source of energy at 60. Accordingly, the throwing of the switch 40 to the "on" position both rotates the individual fan blades to their angular operative positions and causes rotation of the blade assembly to thereby impart the desired air flow through the conduit 10. Inasmuch as the flow induced by the fan is not sufficient to operate the air flow switch 42 while the airplane is still on the ground, the fan will continue to be driven by the motor 12, with the blades 16 in their operative positions indicated by the letter B in Figs. 3 and 4.

Assuming now, however, that the aircraft takes off, as soon as the relative airspeed and the rammed air flow is sufficient the vane 53 will be deflected against the tension spring 54 and the switch 42 thrown over to place the line 30 in circuit. As the switch 42 is actuated, the current is cut off from the line 29 thereby de-energizing the relay 55 and interrupting the current to the fan motor 12 which then becomes stopped. With the current now flowing through the line 30, the brush 33, slip ring 36 and the line 44, the blade actuator motor 21 is energized and rotates the blades into their fully opened and feathered position C, at which the blades are alined with the airflow being stopped at that position automatically when the corresponding limit switch becomes opened. Accordingly, with the airplane in flight, the blower motor has been disconnected and the fan blades rotated into their fully feathered positions C in which they offer a minimum resistance to the rammed air flow which passes over the blades 16 and the aligned guide vanes 14 through the duct 10 to the heater unit 8. The heater 8 is placed in operation by the manual closing of the heater switch 40. This can, of course, be done at any time regardless of whether the craft is on the ground or is in the air, the lack of ram air on the ground insuring fan operation due to the ram air switch 42. And as long as the aircraft is in flight and the rammed air flow is sufficient to maintain the rammed air switch 42 in its actuated position, the blades 16 remain fixed and permit the rammed air flow to enter the system. In the event the aircraft is landed under these conditions with the switch 40 in the "on" position, the blades will again be rotated to their operative positions and the motor 12 will be started by the return of the switch 42, and the flow maintained by the driven fan blades as described above.

Similarly in the event the aircraft takes off with the heater system shut down and the switch 40 in the "off" position and during flight the switch 40 is thrown "on," the ground air switch 42 having already been actuated by the rammed air flow against the vane 53, immediately causes rotation of the blades into their full feathered positions C through the control mechanism described above, and due to the relay 55 not being energized, no current will flow to the motor 12 and the fan will not rotate, permitting the rammed air to flow past the fixed feathered blades.

It will, accordingly, be seen that a very compact and efficient arrangement is provided by the improved flow control fan or blower the blades of which may be selectively controlled from a fully closed zero flow condition A in which it serves as a stop valve to prevent rammed air from flowing into the system, to an intermediate optimum blade position B in which the fan blades are power driven and impel or induce flow through the system, to a full-feathered fully opened position C in which the motor is stopped and the rammed air flows freely past the feathered fan blades and into the system. While the improved flow control fan has been shown in conjunction with a heating or de-icing system for aircraft, it is not limited thereto but has general application to any system wherein it is desirable to accomplish the above-described conditions. Also while a fan of the three-position blade type has been shown and described, it will be obvious that the advantageous results of the improved system can be obtained by other adjustable blade types, or they could be fully adjustable to any position throughout the entire range.

Other forms and modifications of the present invention, both with respect to its general arrangement and the details of its respective parts, are intended to come within the scope and spirit of the present invention as more particularly set forth in the appended claims.

I claim:

1. In an aircraft heating system, an aircraft body, a duct within said body having an inlet opening therethrough to the relative airstream, a heater disposed within said duct, an adjustable blade fan disposed within said duct between said heater and said inlet, a first motor operatively connected to drive said fan, a second motor operatively connected to adjust the pitch of the blades of said fan, means to actuate said second motor for selectively adjusting the blades of said fan between a position in which they completely interrupt the air flow through said duct to a position in which they present a minimum resistance to the rammed air flow entering said inlet and passing through said duct, and electric de-icing means disposed on the outer surface of said duct in the region of the plane of rotation of said fan blades.

2. In an aircraft heating system, an aircraft body, a duct within said body having an inlet opening therethrough to the relative airstream, a heater disposed within said duct, an adjustable blade fan disposed within said duct between said heater and said inlet, first power means operatively connected to drive said fan, second power means operatively connected to adjust the pitch of said fan blades between the opened and closed positions, a plurality of limit switches in circuit with said second power means, and ram flow switch means actuated by the flow in said duct in circuit with said first power means, said second power means, and said limit switches whereby with said heater in operation during flight with ram air supply entering said inlet and said fan stopped with said blades in a feathered position the landing of the aircraft and drop in air flow through said duct causes actuation of said ram air flow switch means placing said second power means in circuit through said limit switches for the adjustment of the pitch of said blades to their operative position and initiating the drive of said fan by said first power means.

3. In an aircraft heating system, an aircraft body, a duct within said body having an inlet opening therethrough to the relative airstream, a heater disposed within said duct, an adjustable blade fan disposed within said duct between said heater and said inlet; power means including a first motor for driving said fan; a second motor for adjusting the pitch of said fan blades into a full open position, an operative position and a full closed position; switch means disposed within said duct to actuate said second motor in accordance with ram air flow occurring during flight of the aircraft, and control means in circuit with said switch means and said motors for selectively starting and stopping the heating system and for adjusting the pitch of said blades.

4. In an aircraft heating system, an aircraft body, a duct within said body having an inlet addressed to the relative airstream for the entrance of ram air flow, a blower disposed within said duct, first power means for driving said blower, a heater disposed within said duct on the downstream side of said blower, said blower having controllable pitch blades, second power means rotatably carried by said blower for controlling the pitch of said blower blades, limit switches rotatably carried by said blower and operatively connected to said second power means, ram air switch means associated with said duct inlet and operatively connected to said second power means and said limit switches, and relay means actuated by said ram air switch means in accordance with the ram air flow through said duct inlet for stopping said first power means and adjusting said blades to their full feathered position.

5. In an aircraft, a duct having a ram air inlet, switch means associated with said ram air inlet actuated in accordance with ram air flow, a power driven blower disposed in said duct, a blower motor for driving said blower, adjustable pitch blades on said blower, a blade motor for actuating the pitch of said blades, and control means connecting said switch means and said motors whereby when said switch means is actuated, said power driven blower motor is shut off and said blades are rotated by said blade motor to positions in which they open said duct.

6. In an aircraft heating system, a duct having a ram air inlet, a heater disposed in said duct, switch means associated with said ram air inlet actuated in accordance with ram air flow, a power driven blower disposed in said duct, a blower motor for driving said blower, adjustable pitch blades on said blower, a blade motor for actuating the pitch of said blades, and control means in circuit with a source of power and with said heater, switch means and said motors whereby said power driven blower motor is automatically shut off and said blades rotated by said blade motor to positions in which they close off said duct when said heating system is shut off by said control means.

7. In a ducted fan installation, a duct having a wall of circular cross-section, said duct having an inlet subjected to ram air flow, a fan coaxially supported within said duct, a motor for the drive of said fan, said fan having adjustable pitch blades, an actuator operatively associated with said fan blades, said blades of said fan adjustable by said blade actuator to a transversely alined minimum pitch position in which the outer peripheral edges of said blades are contiguous to the inner surface of the wall of said duct and the lateral edges of each said blade closely abut and are alined with the corresponding lateral edges of the adjacent blades to effect a substantially complete closure of said duct against the ram air flow therethrough, said blades adjustable by said blade actuator to a maximum pitch position in which said blades are disposed longitudinally and in alinement with the axial flow through said duct in which position said blades present a minimum resistance to said flow, and said blades also adjustable by said blade actuator to an intermediate optimum pitch position in which said blades may be driven by said fan motor for effectively forcing air through said duct at such time as said inlet is not subjected to ram air flow.

References Cited in the file of this patent
UNITED STATES PATENTS

| | | |
|---|---|---|
| 1,475,389 | Hyatt | Nov. 27, 1923 |
| 1,756,215 | Schneider | Apr. 29, 1930 |
| 1,830,858 | Schoepp et al. | Nov. 10, 1931 |
| 1,875,993 | Everts | Sept. 6, 1932 |
| 2,148,843 | Stephens | Feb. 28, 1939 |
| 2,187,506 | Van Daam | Jan. 16, 1940 |
| 2,306,096 | Vose | Dec. 22, 1942 |
| 2,383,002 | Mader | Aug. 21, 1945 |
| 2,479,668 | Brandon et al. | Aug. 23, 1949 |
| 2,503,822 | Howes | Apr. 11, 1950 |
| 2,523,404 | Wallace | Sept. 26, 1950 |
| 2,665,055 | Adams | Jan. 5, 1954 |